United States Patent
Keskilammi et al.

(10) Patent No.: US 6,819,243 B2
(45) Date of Patent: Nov. 16, 2004

(54) METHOD AND APPARATUS FOR IDENTIFYING BULK GOODS, PREFERABLY ROLL-LIKE BULK GOODS

(76) Inventors: Mikko Keskilammi, Insinöörinkatu 32 B 59, FIN-33720 Tampere (FI); Lauri Sydänheimo, Hillerivahe 4, FIN-26200 Rauma (FI)

( * ) Notice: Subject to any disclaimer, the term of this patent is extended or adjusted under 35 U.S.C. 154(b) by 0 days.

(21) Appl. No.: 09/824,522

(22) Filed: Apr. 2, 2001

(65) Prior Publication Data

US 2001/0038333 A1 Nov. 8, 2001

(30) Foreign Application Priority Data

| Apr. 3, 2000 | (FI) | 20000762 |
|---|---|---|
| Apr. 3, 2000 | (FI) | 20000763 |
| Apr. 3, 2000 | (FI) | 20000764 |

(51) Int. Cl.$^7$ ............................................. G08B 13/14
(52) U.S. Cl. ................... 340/572.1; 340/572.7; 340/825.69; 340/10.1
(58) Field of Search ................ 340/572.1, 572.2, 340/572.3, 572.4, 572.7, 825.69, 825.71, 539, 556, 671, 672, 10.1, 10.3, 10.4

(56) References Cited

U.S. PATENT DOCUMENTS

| 4,463,251 A | * 7/1984 | Koutonen et al. ........ 235/470 |
|---|---|---|
| 4,654,658 A | * 3/1987 | Walton ................ 340/825.54 |
| 4,990,921 A | 2/1991 | Chisholm .................... 342/35 |
| 5,354,976 A | * 10/1994 | Makinen et al. ........... 235/462 |
| 5,604,715 A | 2/1997 | Aman et al. ............... 367/118 |
| 5,719,586 A | 2/1998 | Tuttle ........................ 343/726 |
| 5,821,524 A | * 10/1998 | Horlbeck et al. .......... 235/483 |
| 5,971,281 A | * 10/1999 | Frary et al. ................ 235/487 |
| 6,008,727 A | * 12/1999 | Want et al. ........... 340/825.54 |
| 6,069,564 A | * 5/2000 | Hatano et al. .......... 340/572.7 |
| 6,195,007 B1 | * 2/2001 | Takayama et al. ....... 340/572.1 |
| 6,232,870 B1 | * 5/2001 | Garber et al. ........... 340/572.4 |
| 6,453,808 B1 | * 9/2002 | Nieminen et al. ............ 101/43 |

FOREIGN PATENT DOCUMENTS

| FR | 2697680 | 5/1994 |
|---|---|---|
| GB | 2328320 | 2/1999 |
| WO | 99/50788 | 10/1999 |
| WO | 00/16286 | 3/2000 |
| WO | 0026991 | 5/2000 |

* cited by examiner

*Primary Examiner*—Jeffery Hofsass
*Assistant Examiner*—Daniel Prévil
(74) *Attorney, Agent, or Firm*—Ladas & Parry

(57) ABSTRACT

In a method for identifying bulk goods from a radio frequency identification device on the bulk goods with a radio frequency reader antenna a radiation midpoint of the radio frequency reader antenna is moved along the radio frequency reader antenna and radiation from the radio frequency identification device is directed toward the radio frequency reader antenna.

15 Claims, 4 Drawing Sheets

METHOD AND APPARATUS FOR IDENTIFYING BULK GOODS, PREFERABLY ROLL-LIKE BULK GOODS

Figure 1:
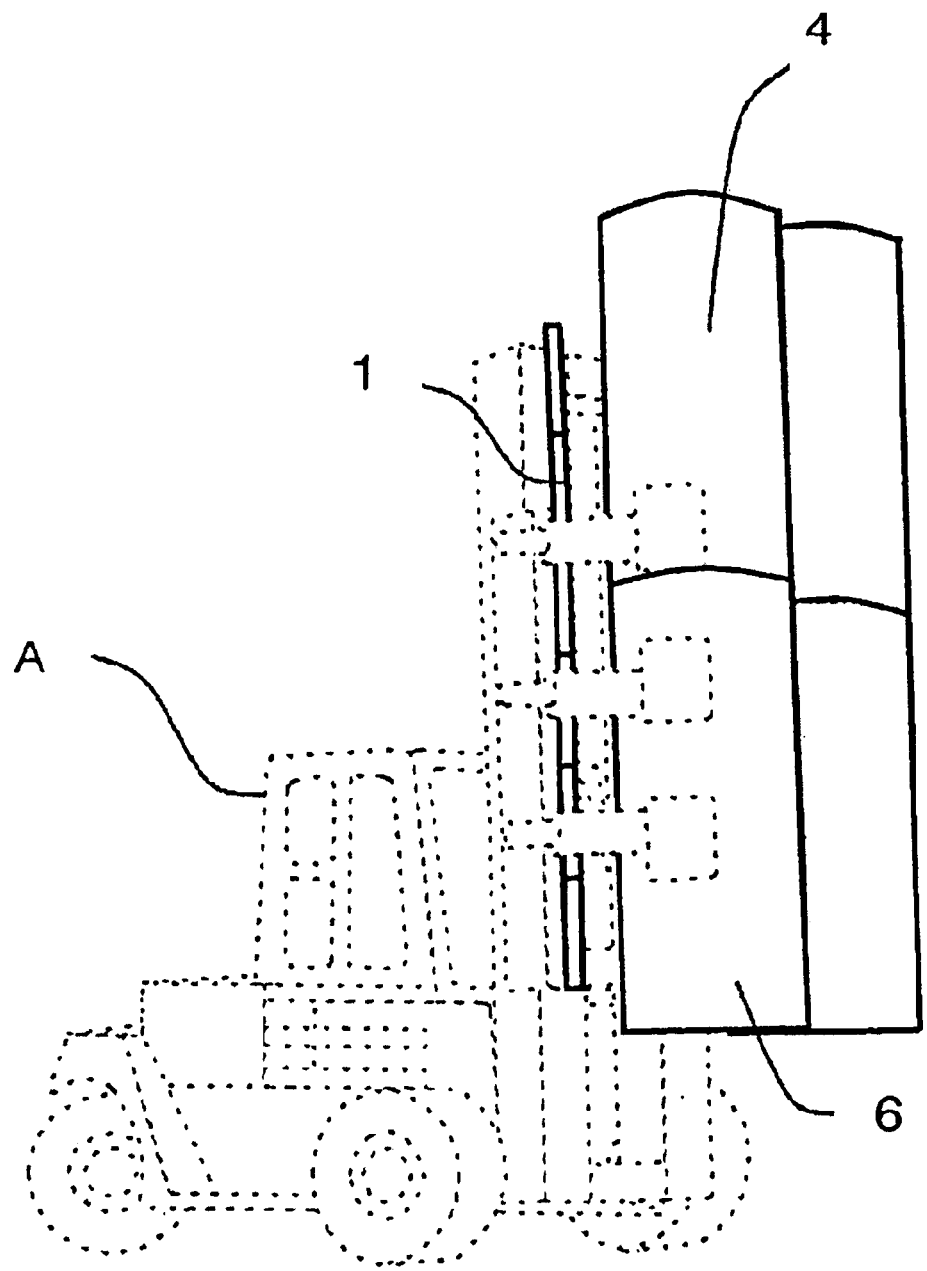

The invention relates to a method for the identification of bulk goods, preferably the identification of roll-like bulk goods, in which method a radio frequency reader antenna is used to identify a radio frequency identification device arranged in the bulk goods.

The invention further relates to an apparatus for the identification of bulk goods, preferably the identification of roll-like bulk goods, the apparatus comprising a radio frequency reader and a radio frequency identification device arranged in the bulk goods.

Known systems for the identification of bulk goods use optical identification methods, such as a bar code or a printed number series. U.S. Pat. No. 4,463,251 discloses a method for the identification of paper rolls, based on optical reading of a code marked at the end of the roll by means of a laser beam, for example. However, optical methods require a sufficient level of illumination. Furthermore, tags are susceptible to getting dirty, being chafed and wear, resulting in impaired identification. Optical identification systems also require a direct and completely unobstructed visual contact between the object and the reader, preventing identification from every direction.

Radio frequency identification systems are also used in the identification of bulk goods, wherein an identification device including a code enabling individualization is arranged in the bulk goods to be identified, and the code included in the identification device is read with a special reader. Such identification systems are disclosed in PCT publications WO 99/50788 and WO 00/16286.

In radio frequency identification systems, data is transferred between an identification device and a reader wirelessly by means of electromagnetic waves. Antenna solutions, in both the identification device and the reader, are crucial to the performance of radio frequency identification systems. According to their operation frequency, these radio frequency identification systems are dividable into low frequency and high frequency systems. In low frequency systems, a magnetic field is used in the coupling between the identification device and the reader, and various loop solutions are used as antennas. in low frequency systems, the reading distance is short and the reading distance depends on the areas of the antenna coils and their mutual positions. In high frequency systems, an electric field is used in the coupling, and the antennas used are usually dipole, folded dipole or microstrip antennas. Out of these, dipole and folded dipole antennas are omnidirectional, whereas a microstrip antenna is directional. in high frequency systems, the identification device is either active or passive. Active identification devices comprise a radio transmitter and a battery, whereas passive systems use the energy obtained from the reader. In high frequency systems, the reading distance is longer than in low frequency systems.

As was mentioned above, antennas, which are used for data transfer between an identification device and a reader, are crucial to the performance of radio frequency identification systems. The strength of the coupling between the antennas is affected by the alignment between the antennas, the radiating properties of individual antennas and the distance between the antennas.

Known reader antennas in radio frequency identification systems use a non-directional or fixedly aligned radiation beam or the radiation beam is directed from one point. These systems do not efficiently utilize the properties of the antennas. The problem in a non-directional reader antenna is the loss of transmitted power in directions that are useless for identification. In fixedly directed reader antennas, the tag may be outside the radiation beam of the reader antenna or the object to be identified may be larger than the reading range of the reader antenna. If the radiation beam is directed from one point, the reflection of the radiation emitted from the antenna from the boundary surfaces of the object to be identified interferes with the identification. This reflection occurs particularly when the incidence angle of the radiation deviates a lot from the perpendicular of the boundary surface. Furthermore, the distance between the identification device attached to the object and the reader antenna increases particularly at the edges of the reading range. This increases and attenuates the distance traveled by the radiation in the medium more compared with perpendicular alignment. For example, in a passive system utilizing backscattering, well known to a person skilled in the art, doubling the reading distance increases the attenuation to 16-fold. Furthermore, the boundary surfaces of the mediums cause diffraction as the signal penetrates them at an angle different from that of the perpendicular of the surface. This is one of the reasons why reasonably priced radio frequency identification systems have not been used in the logistics of for example paper rolls.

In the identification of bulk goods, the position of the object to be identified cannot usually be determined or predicted; instead, the radiation maximum of the antenna of the identification device attached to the object may face away from the reader antenna or the polarization levels of the antennas may be perpendicular to each other. The distance between the antennas may also be long or there may be material through which the radio waves have to propagate.

The dipole and folded dipole antennas generally used in radio frequency identification devices are usually omnidirectional, i.e. they emit electromagnetic radiation in all directions. However, these antenna types have low amplification. Furthermore, the frequency bands used by radio frequency identification devices have an officially regulated highest permitted transmission power, i.e. directional antenna structures can be used for improving the transmission of an identification device, if required. The use of directional, i.e. amplifying antenna structures, such as a microstrip antenna or an antenna array, allows the electromagnetic radiation power transmitted by the antenna to be directed more efficiently in the desired direction. This improves the coupling between the identification device and the reader antennas in the direction of the maximum of the radiation beam of the directional antenna compared with omnidirectional antennas, whereas the coupling is weaker outside the radiation beam than with omnidirectional antennas.

Roll-like bulk goods, such as paper or cardboard rolls, have to be identified always when the roll is handled at a factory, warehouse, when loading a conveyer chain or at the warehouse of a printing house. A roll is identified in a controlled situation, wherein the position of the roll with respect to its cylinder axis is known, i.e. the roll is either in a vertical or in a horizontal position. As far as the antenna of the identification device is concerned, this means that the polarization plane of the antenna is known. In contrast, the position angle of the roll around the cylinder axis is not known. In other words, when the identification device to be arranged in the roll uses a directional antenna element, the direction of the maximum of the antenna radiation beam is not known. If an identification device arranged on the surface of the roll is used in this kind of a situation, in the worst case the identification device is on the opposite side of the roll and the direction of the radiation beam of the antenna of the identification device is opposite to the direction from which the reader makes the identification. This means that reliable identification is very unlikely in such a situation.

The object of the invention is to provide a method and an apparatus for avoiding the drawbacks of known solutions and for achieving simpler and better identification of bulk goods, preferably roll-like bulk goods, than previously.

The method of the invention is characterized in that the radiation midpoint of a directed radiation beam of the radio frequency/reader is moving and said midpoint is used for perpendicular identification of an object to be identified, and that the radio frequency identification device arranged in the bulk goods uses an intelligent algorithm to direct the radiation beam of its antenna elements towards the radio frequency transmitter/reader.

The apparatus of the invention is characterized in that the apparatus comprises a radio frequency transmitter/reader, the radiation midpoint of the directed radiation beam of the antenna of which is arranged to move to perpendicularly identify an object to be identified, and a radio frequency identification device arranged in the bulk goods and arranged to use an intelligent algorithm to direct the radiation beam of its antennas towards the radio frequency transmitter/reader.

It is an essential idea of the invention that since the directed radiation beam of the reader antenna that has a moving radiation midpoint performs a perpendicular identification of the identification device arranged in a roll, and the identification device arranged in the roll uses an intelligent algorithm to direct the radiation beam of the antennas towards the reader antenna, the distance between the reader antenna and the identification device arranged in the roll always remains as short as possible. This reduces signal distortion and interfering reflections of the medium at the boundary surfaces. Since the distance is minimized and there are few interfering reflections and signal distortions, the power level required for a reliable radio link is significantly lower. Furthermore, it is an essential idea of a preferred embodiment of the invention that amplifying antenna arrays or some such system is used to create the radiation beam. This significantly improves the radio frequency connection between the reader and the object to be identified, allows the reading range to be protected against spurious signals from outside the range and a reliable identification under all circumstances and situations at every stage of the logistics chain of the object to be identified.

In accordance with the invention, this aim is achieved by using one or more radiating elements in the reader antenna and changing the feed of the elements to allow the radiation midpoint of the antenna to shift on the axis of the antenna in order for the distance between the reader antenna and the identification device arranged in the object to be identified to remain as short as possible. Furthermore, the direction of the radiation beam can be changed such that, together with said distance between the reader antenna and the identification device of the object to be identified, the incidence angle of the radiation with respect to the boundary surface of the object to be identified is optimized. A radio frequency identification device provided with a plurality of directional antenna elements is used in a roll. The antenna elements are arranged around the cylinder axis of the roll such that they allow the transmission of the identification device to be transmitted in the desired direction on a plane perpendicular to the cylinder axis and an as advantageous a distance to the reader antenna as possible. When the radiating element used is for example one microstrip antenna the width of whose half power radiation beam is for example 90 degrees, at least four such elements are needed to cover the full 360 degrees, from which the identification may be performed with the reader. The simultaneous use of a plurality of antenna elements in the same way as an antenna array also allows the transmission from the identification device to be transmitted in the desired direction. The choice of reader and, consequently, transmission direction is performed in the identification device by means of an intelligent algorithm or some such method. The intelligent algorithm of the identification device identifies the direction from which the transmission of the reader is coming and transmits its transmission in the same direction.

It is an advantage of the invention that it allows reliable identification of roll-like bulk goods in a dark, dusty and misty environment. Identification may also be performed from any direction. The cover paper of the roll may also get dirty, wear or be chafed without the identification being impaired.

Figures 2, 3:
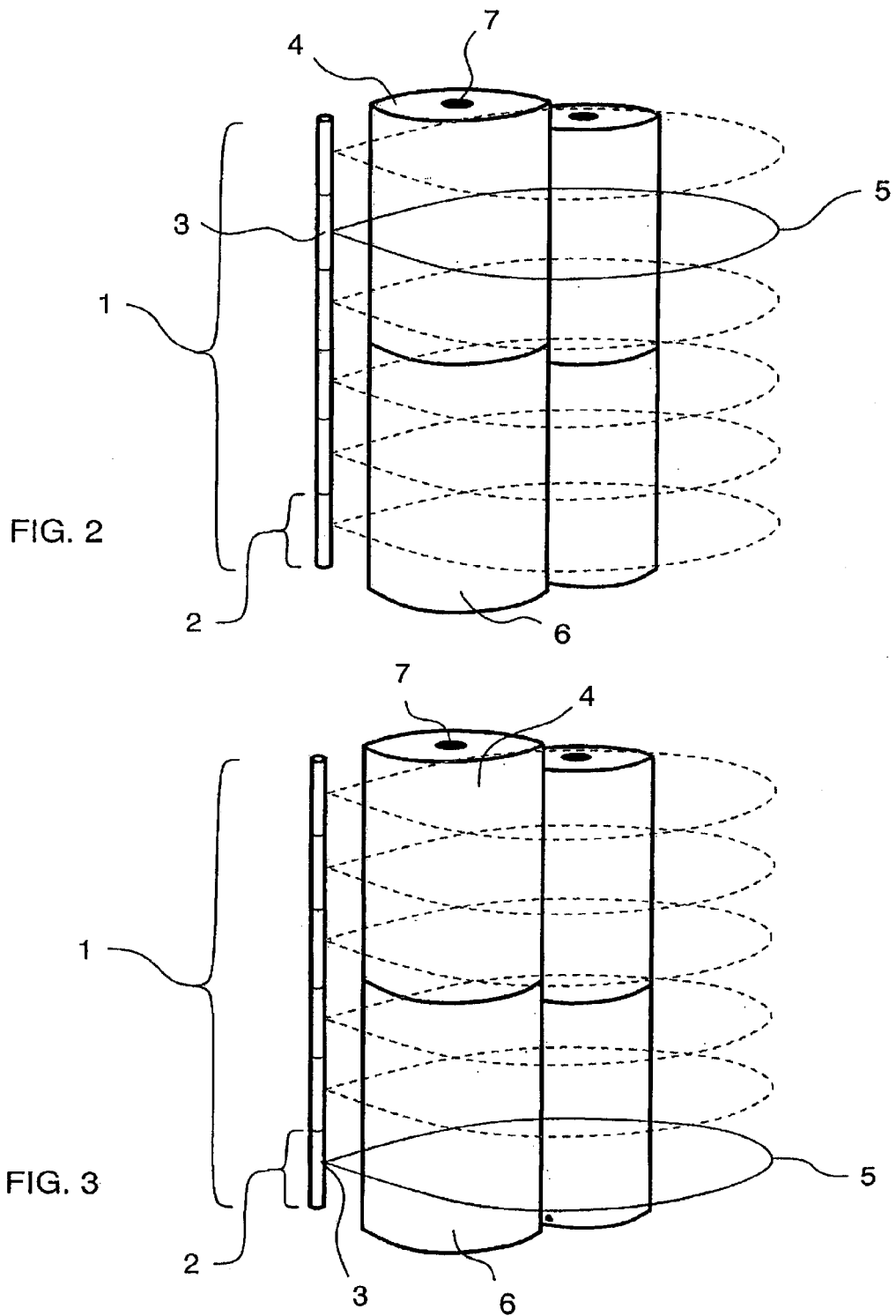
Figure 4:
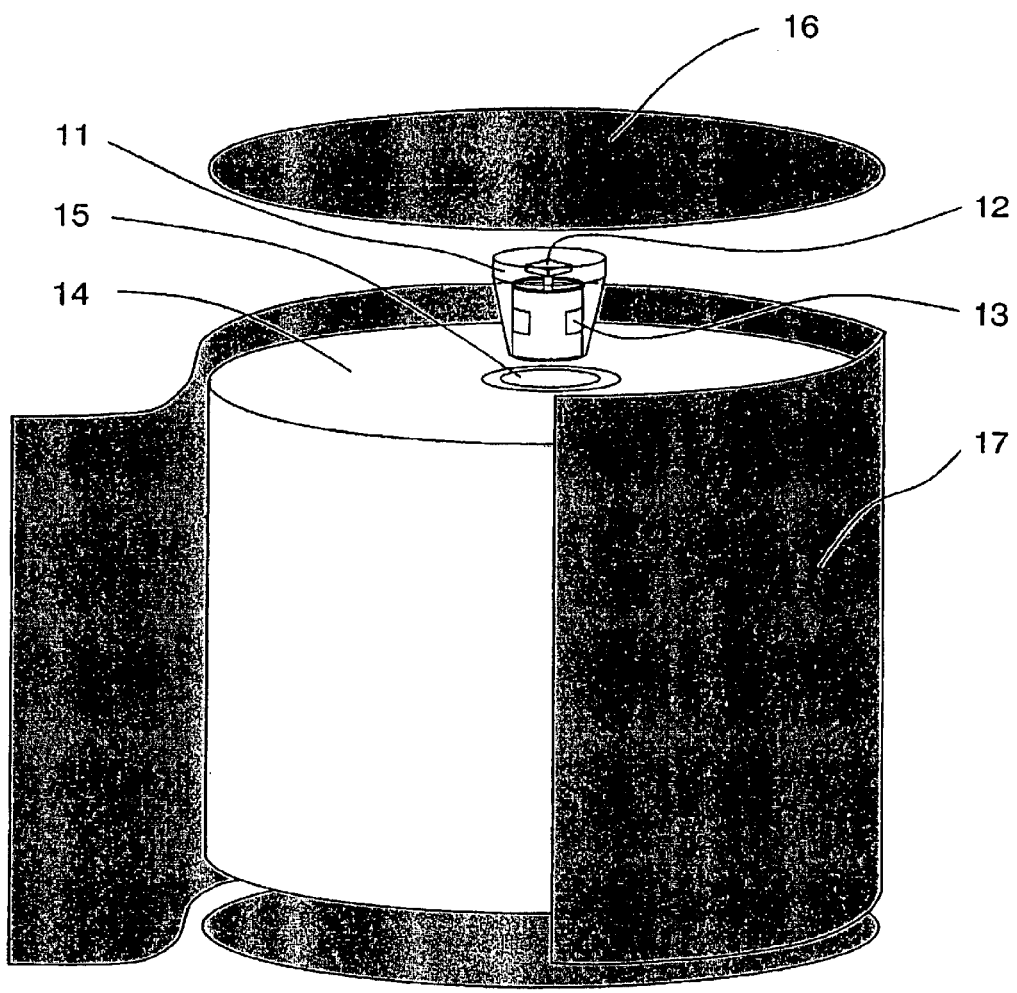
Figure 5:
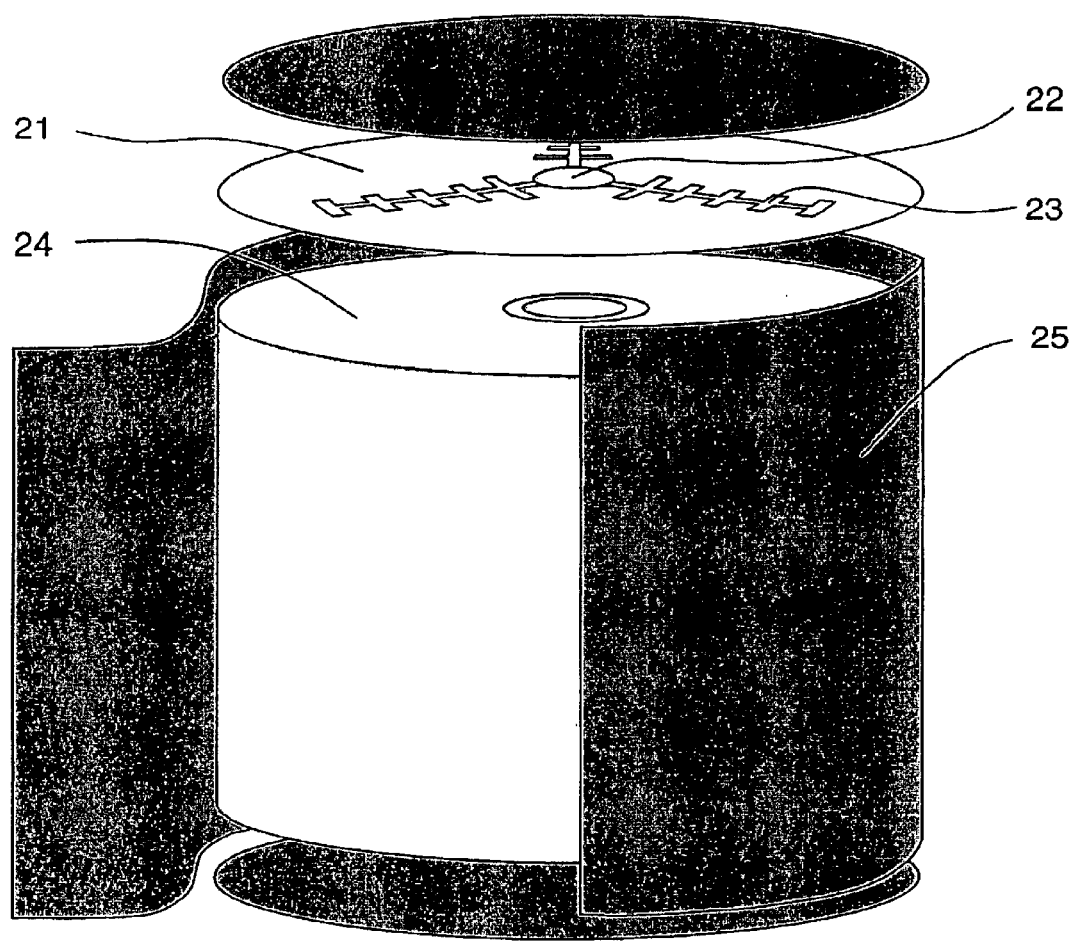

The invention will be described in greater in the accompanying drawings, in which FIG. 1 schematically shows a typical forklift used for moving bulk goods, FIGS. 2 and 3 schematically show a solution of the invention for the identification of roll-like bulk goods, FIG. 4 schematically shows a radio frequency identification device to be attached to roll-like bulk goods, and FIG. 5 schematically shows a second radio frequency identification device to be attached to roll-like bulk goods.

FIG. 1 schematically shows a typical forklift A that is used for moving bulk goods and whose draw beam is provided with a reader antenna 1 described in the invention.

FIGS. 2 and 3 schematically show a solution of the invention for the identification of roll-like bulk goods. In the figures, the reader antenna 1 is composed of one or more antenna arrays 2 arranged to form a vector. Controlling the feeds of the antenna arrays allows the radiation midpoint 3 of the reader antenna 1 to shift along the axis of the reader antenna 1 in the direction of the vector. This allows a radio frequency identification device 7 in bulk goods 4 to be read with a radiation beam 5 directed from the shortest possible distance. The radiation beam 5 is perpendicular to the surface of the bulk goods 4, thus eliminating reflections and signal distortion. When the radio frequency identification device is read from bulk goods 6, an identification system changes the feeds of the antenna arrays 2 of the reader antenna 1 such that the radiation midpoint 3 shifts to an ideal point on the axis of the reader antenna 1 for identifying the bulk goods 6. Other solutions that deviate from what was described above are also feasible in the invention. Consequently, the angle of the radiation beam 5 with respect to the reader antenna 1 may deviate from perpendicular or it may vary.

FIG. 4 schematically shows a radio frequency identification device 12 to be arranged in bulk goods, preferably roll-like bulk goods. The radio frequency identification device is arranged in a plug to be placed in an inner paper roll core. A stopper or plug 11, made from plastic, wood or the like insulating material provides the body of the radio frequency identification stopper of the roll, and said radio frequency identification device 12 and for example four radiating microstrip antenna elements 13 are arranged therein. The radio frequency identification stopper 11 of the roll is arranged in an inner core 15 of a paper roll 14. The figure also shows an end cover 16 and a wrapper cover 17 for protecting the roll.

Upon identification of the roll, wherein the radio frequency identification stopper 11 is arranged, with the reader 1 composed of one or more antenna arrays as shown in FIGS. 1, 2 and 3, the radio frequency identification device 12 replies to the reader 1 by means of the radiating microstrip antenna element 13 that provides the best possible connection. The use of said microstrip antenna elements 13 in the radio frequency identification stopper 11 of the roll allows the transmission of the radio frequency identification device 12 to be amplified and directed, thus improving the reliability of the identification.

FIG. 5 schematically shows a second radio frequency identification device 22 to be attached to a roll. Herein, the radio frequency identification device 22 and one or more radiating elements are arranged in the end cover of a paper roll by way of example. The identification device and the radiating elements may be arranged in end covers of rolls used in paper industry such that they do not perceivably change the structure and appearance of the end covers. An end cover 21 of cardboard or the like constitutes the body of the radio frequency identification end cover of the paper roll. The end cover 21 is provided with the radio frequency identification device 22, to which for example three radiating antenna elements 23 are coupled. These radiating antenna elements may be based on a Yagi, microstrip, wire, meander or other directional antenna structure well known to a person skilled in the art. The radio frequency identification end cover 21 of the paper roll is arranged to protect the end of a paper roll 24. In addition to this, the paper roll is covered with a wrapper cover 25.

Upon identification of the roll 24, wherein the radio frequency identification end cover 21 is arranged, with the reader 1 composed of one or more antenna arrays as shown in FIGS. 1, 2 and 3, the radio frequency identification device 22 replies to the reader 1 by means of the radiating antenna element 23 that provides the best possible connection. The use of said Yagi antenna elements 23, for example, allows the transmission of the radio frequency identification device 22 to be amplified, thus improving the reliability of the identification.

The drawings and the related description are only intended to illustrate the inventive idea. The details of the invention may vary within the scope of the claims. Accordingly, the radio frequency identification device 22 and one or more radiating elements 23 may be connected as a separate component to the end structure of the paper roll.

What is claimed is:

1. In a method for identification of bulk goods, in which method a radio frequency transmitter/reader (1) is used to identify a radio frequency identification device (12, 22) arranged in the bulk goods, the improvements comprising:
   moving a radiation midpoint (3) of a directed radiation beam (5) of the radio frequency transmitter/reader (1);
   using said midpoint (3) for perpendicular identification of an object to be identified; and
   directing radiation of radiating antenna elements (13, 23) with the radio frequency identification device (12, 22) towards the radio frequency transmitter/reader (1).

2. A method as claimed in claim 1, characterized in that the intelligent algorithm of the radio frequency identification device (12, 22) is used to identify the direction from which the transmission of the radio frequency transmitter/reader (1) is coming, and the intelligent algorithm is used to transmit a new transmission back in said direction.

3. A method as claimed in claim 1, characterized in that the feed of the radio frequency transmitter/reader (1) is changed to shift the radiation midpoint (3) on the axis of an antenna of the radio frequency transmitter/reader (1).

4. A method as claimed in claim 1, characterized in that the direction of the radiation beam (5) is changed with respect to the axis of an antenna of the radio frequency transmitter/reader (1).

5. A method as claimed in claim 1, characterized in that the feed of the radio frequency transmitter/reader (1) is changed to shift the radiation midpoint (3) on the axis of an antenna of the radio frequency transmitter/reader (1), and amplifying antenna arrays or the like system is used for creating the radiation beam (5).

6. An apparatus for identification of bulk goods, the apparatus comprising a radio frequency transmitter/reader (1) and a radio frequency identification device (12, 22) arranged in the bulk goods, characterized in that a radiation midpoint (3) of a directed radiating beam (5) of the radio frequency transmitter/reader is arranged to move, that said radiation midpoint (3) is arranged to perpendicularly identify an object to be identified, and that the radio frequency identification device (12, 22) arranged in the bulk goods directs radiation of radiating antenna elements (13, 23) towards the radio frequency transmitter/reader (1).

7. An apparatus as claimed in claim 6, characterized in that the distance between the radio frequency transmitter/reader (1) and the radio frequency identification device (12, 22) in the object to be identified remains as short as possible.

8. An apparatus as claimed in claim 6, characterized in that at least one radiating antenna element (13, 23) is arranged in the radio frequency identification device (12, 22) in the object to be identified.

9. An apparatus as claimed in claim 8, characterized in that the radiating antenna elements (13, 23) of the radio frequency identification device (12, 22) in the object to be identified are arranged around the cylinder axis of the roll-like bulk goods.

10. An apparatus as claimed in claim 6, characterized in that the angle of the radiation beam (5) of the radio frequency transmitter/reader (1) with respect to an antenna thereof is arranged fixed or variable.

11. An apparatus as claimed in claim 6, characterized in that an antenna or the antenna array of the radio frequency transmitter/reader is arranged omnidirectional, directional or amplifying.

12. An apparatus as claimed in claim 6, characterized in that the direction of the radiation beam (5) is changed with respect to the axis of an antenna of the radio frequency transmitter/reader (1) and the radio frequency identification device (12, 22) is arranged passive or active.

13. An apparatus as claimed in claim 6, characterized in that the radiating antenna element (13, 23) of the radio frequency identification device (12, 22) is arranged omnidirectional, directional or amplifying.

14. In a method for identifying bulk goods from a radio frequency identification device (12, 22) on the bulk goods with a radio frequency transmitter/reader (1), the improvements comprising:
   moving a radiation midpoint (3) of the radio frequency reader antenna along the radio frequency transmitter/reader and
   directing radiation with the radio frequency identification device toward the radio frequency transmitter/reader.

15. The method as claimed in claim 14, wherein the bulk goods are roll-like, whereby to show an axis, the radio frequency transmitter/reader has an axis arranged generally parallel to the axis shown by the roll-like bulk goods, and the moving of the radiation midpoint is along the axis of the radio frequency transmitter/reader.

* * * * *

UNITED STATES PATENT AND TRADEMARK OFFICE
CERTIFICATE OF CORRECTION

PATENT NO.     : 6,819,243 B2
DATED          : November 16, 2004
INVENTOR(S)    : Mikko Keskilammi et al.

It is certified that error appears in the above-identified patent and that said Letters Patent is hereby corrected as shown below:

<u>Title page,</u>
Item [*] Notice, "0" should read --110 --.

Signed and Sealed this

Twenty-first Day of June, 2005

JON W. DUDAS
*Director of the United States Patent and Trademark Office*